United States Patent [19]

Sun

[11] Patent Number: 4,682,464
[45] Date of Patent: Jul. 28, 1987

[54] RAKE

[76] Inventor: Han-Ching Sun, No. 43, Ta-An Road, Tien Chung Chen, Changhua Hsien, Taiwan

[21] Appl. No.: 823,093

[22] Filed: Jan. 21, 1986

[51] Int. Cl.⁴ .............................................. A01D 7/00
[52] U.S. Cl. .............................. 56/400.17; 56/400.01; 403/397; 24/546
[58] Field of Search ........... 56/400.01, 400.17, 400.18, 56/400.19, 400.06, DIG. 18; 16/110 R, 114 R; 403/397; 24/546, 558, 566

[56] References Cited

U.S. PATENT DOCUMENTS

| | | | |
|---|---|---|---|
| 1,837,677 | 12/1931 | Rocquin | 56/400.17 |
| 1,989,815 | 2/1935 | McGuire | 56/400.17 |
| 2,666,288 | 1/1954 | Kimura | 56/400.17 |
| 2,721,439 | 10/1955 | Chrunka | 56/400.17 |
| 2,847,816 | 8/1958 | Yeda | 56/400.17 |
| 3,668,849 | 6/1972 | Bunker | 56/400.17 |
| 4,286,893 | 9/1981 | Pomares | 16/114 R X |
| 4,414,797 | 11/1983 | Archer | 56/400.01 X |
| 4,478,033 | 10/1984 | Konyn et al. | 56/400.06 |
| 4,561,239 | 12/1985 | Cook | 56/DIG. 18 X |

FOREIGN PATENT DOCUMENTS 2322814 11/1974 Fed. Rep. of Germany ...... 403/397

Primary Examiner—Stephen J. Novosad
Assistant Examiner—John F. Letchford
Attorney, Agent, or Firm—Lowe Price LeBlanc Becker & Shur

[57] ABSTRACT

The present invention is an improved rake which includes a drag portion having a plurality of prongs and a handle portion connecting to the drag portion by an engaging means which includes a clip member for clipping and a U-shaped member for holding the drag portion and the handle portion that can be used to connect the two portions integrally and firmly when the rake is in use and can be easily detached from each other by releasing the engaging means for convenience in transportation.

4 Claims, 4 Drawing Figures

RAKE

BACKGROUND OF THE INVENTION

The present invention relates to an improved rake, particularly to a bamboo rake having an engaging means with a clip member and a U-shaped member which are capable of holding the drag portion and the handle portion tightly and are easily released from the rake for detatching and separating the drag portion and the handle portion for convenience in transporting.

A rake is used for gathering grass, leaves or other material or for loosening or smoothing the surface of the ground in a garden or crop field. Many known rakes are basically designed as shown in FIG. 1, including a bar 1a with projecting prongs 1 that is set transversely at the end of a long handle 2. The long handle is connected to the bar 1a by a screw 3 and engaged with the prongs portion by a binding plate 4 so that the long handle portion 2 is easily released from the prongs portion 1 after a long period of using. In addition, as the long handle 2 is connected to the prongs portion 1 fixedly, it takes more space in transportation.

The present invention attempts to make improvements on the prior arrangement, introducing a rake with a clip member, which is capable of holding the prongs portion and the handle portion firmly when in use and is easily released from the rake for detaching the prongs portion and the handle portion from each other for convenience in transportation.

SUMMARY OF THE INVENTION

The general object of the invention is to provide an improved rake which is simple in construction and convenient in practical use.

An object of the invention is to provide an improved rake which includes an engaging means having a clip member to clip and a U-shaped member to hold the drag portion and the handle portion firmly together when in use, and allowing the engaging means to be easily released from the rake for separating the two portions to save more space and allow convenience in transportation.

In order to achieve the aforesaid objects as well as other incidental objects and advantages, the invention includes a drag portion having a plurality of prongs which are set transversely at one end and convergent at the other end of the drag portion. A clamping bar provided on the drag portion for clamping the prongs and the bars further includes a pin at its center. A handle portion has a fork member provided at one end of the handle portion. The fork member can be engaged with the pin and retained to the pin firmly by the protruded portion of the pin when the handle portion is connected to the drag portion.

The invention further includes a clip member which is constituted by a single length of wire and formed with a curved portion which is extended upward at an angle to the plane of the clip at one end and two inwardly bent portion at the other end of the clip, and a U-shaped means engaging to the clip member, wherein the clip member and the U-shaped means can hold the handle and drag portion firmly. As the clip member includes two inwardly bent portions which are capable of clipping the handle and drag portions like a spring clip and are easily opened for releasing the two portions for convenience in transportation.

BRIEF DESCRIPTION OF THE DRAWINGS

These and other advantages, objects and features of the present invention will become apparent from the following detailed description of the preferred embodiments with reference to the accompanying drawings, wherein.

DETAILED DESCRIPTION OF THE PREFERRED EMBODIMENT

The following is a detailed description of the best presently contemplated embodiment of the invention. This description is not to be taken in a limiting sense, but is made merely for the purpose of illustrating the general principles of the invention.

Figure 1:
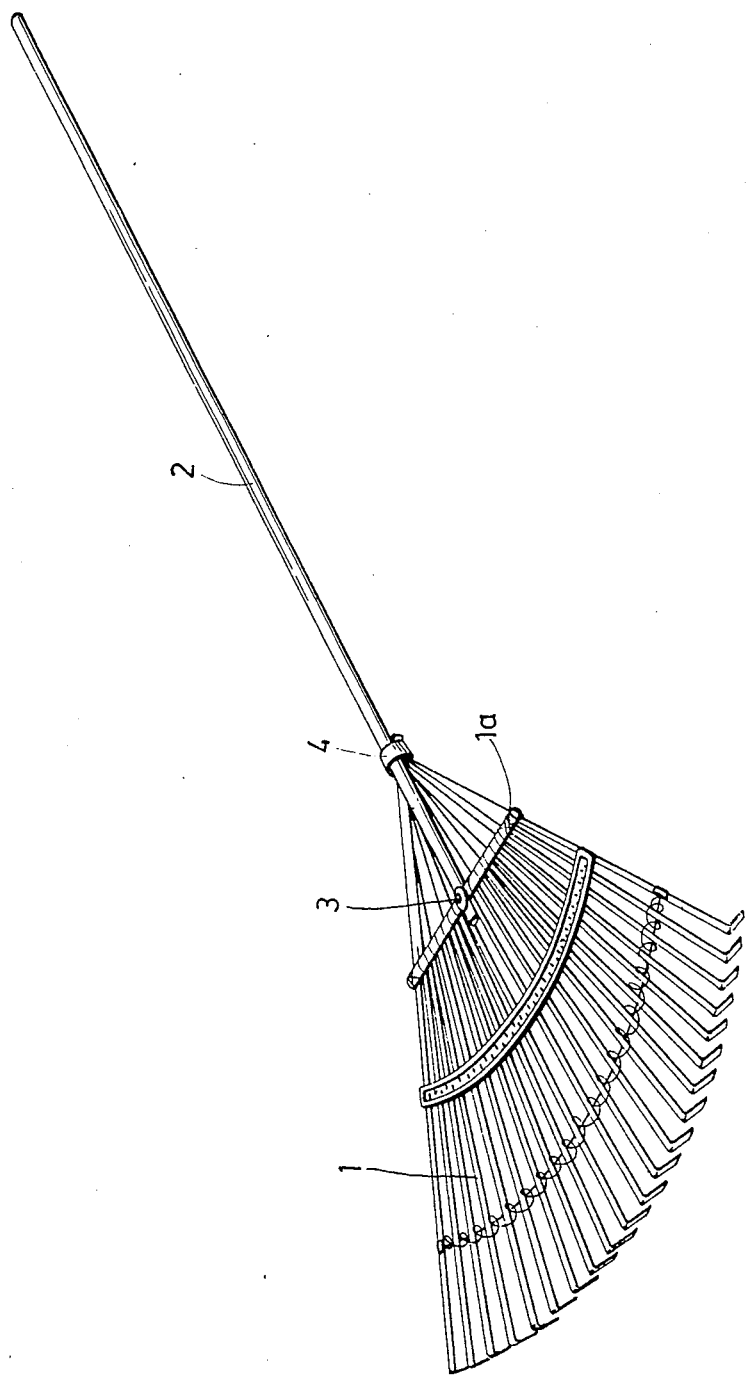
FIG. 1 is a bamboo rake of prior design.
Figure 2:
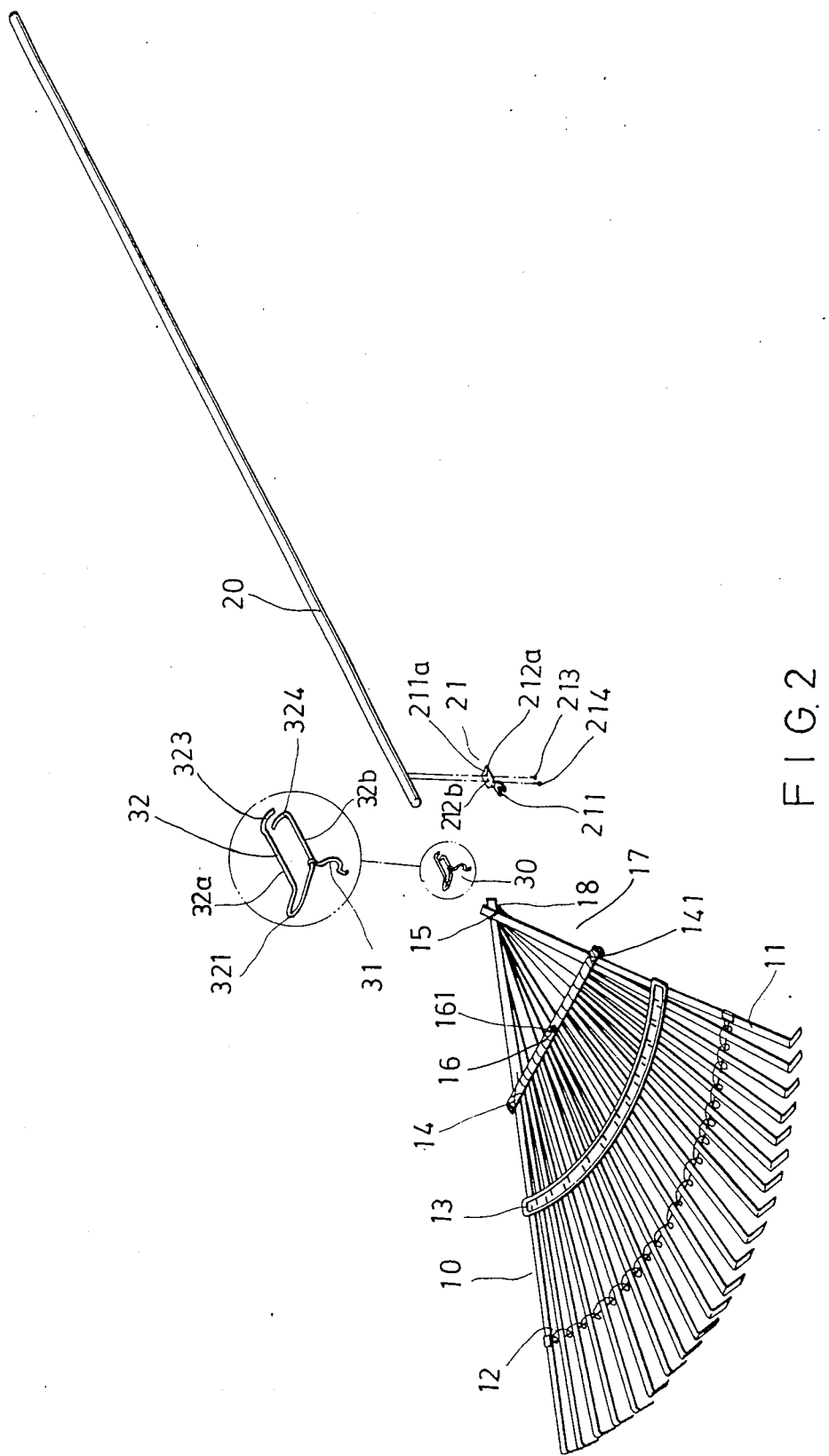
FIG. 2 is an exploded view of a preferred embodiment of the rake and an enlarged view of an engaging means according to the invention.
Figure 3:
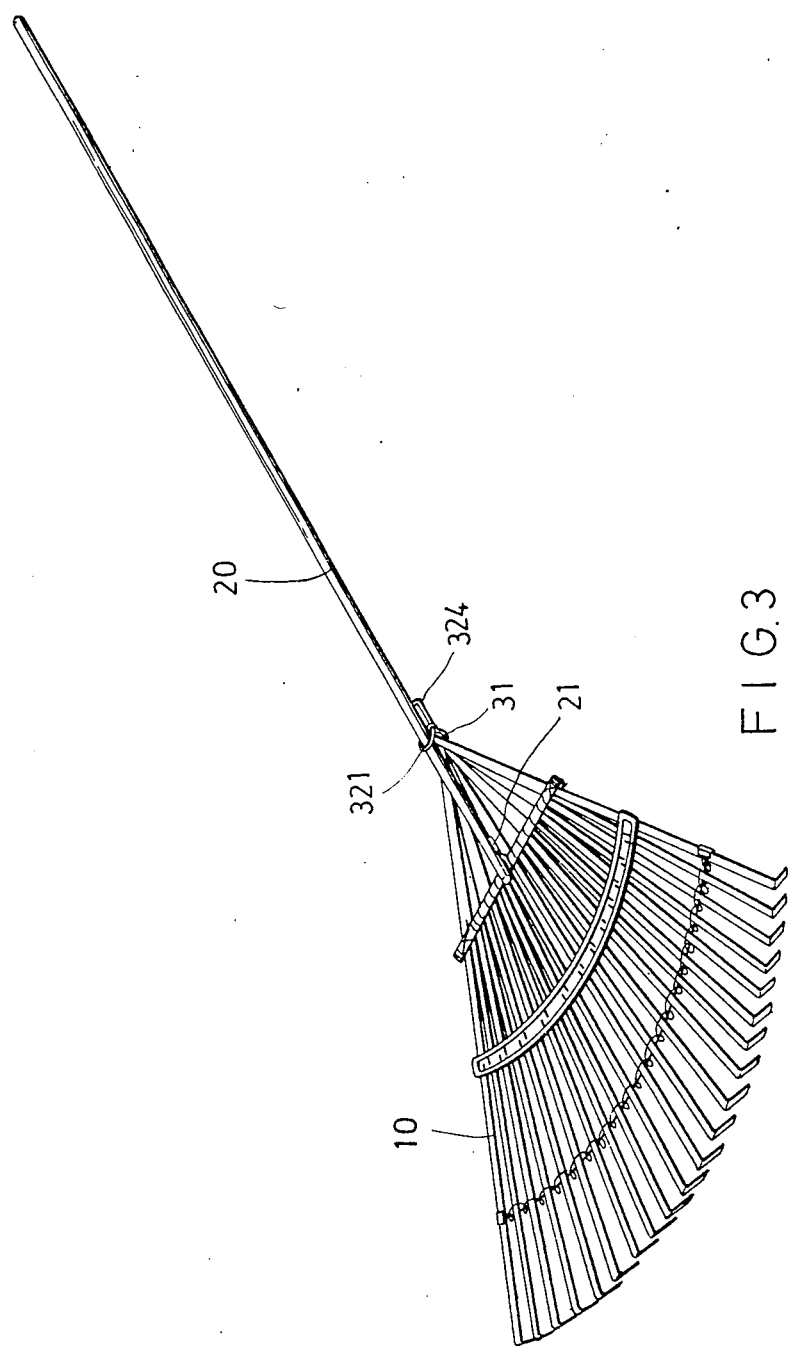
FIG. 3 is a perspective view of FIG. 2 showing the U-shaped member arranged to engage with the two leg portions of the clip member for holding the drag portion and the handle portion together firmly.
Figure 4:
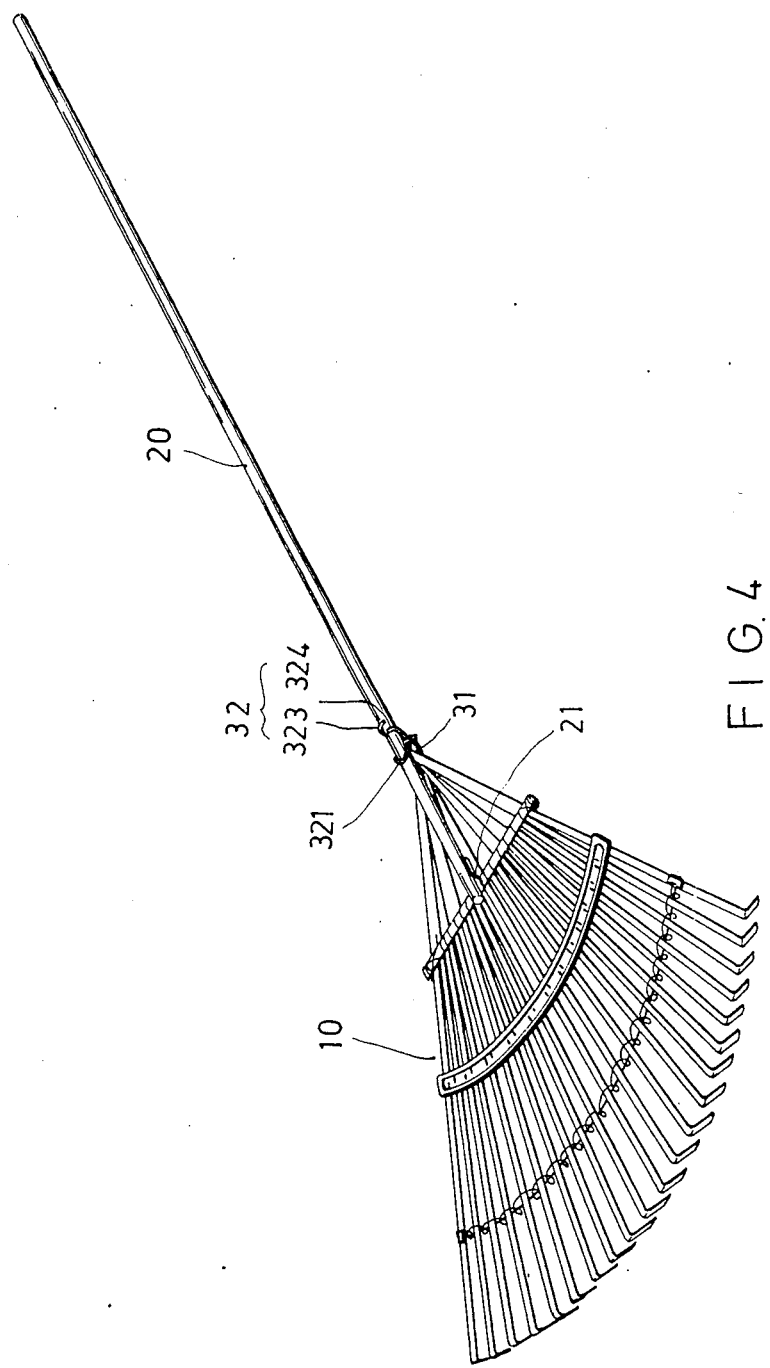
FIG. 4 is a perspective view of the invention showing the clip member arranged to clip the drag portion and the handle portion together like a spring clip.

Referring to FIG. 2, FIG. 3 and FIG. 4, the invention is a bamboo rake including a drag portion 10 and a handle portion 20. The drag portion 10 provides a clamp bar 14 with a plurality of projecting prongs 11 that is set transversely at one end and convergent at the other end 17. The clamp bar 14 is bound by a string 141 for holding the prongs 11 firmly between the clamp bar 14. A binding plate 15 provided at the top portion 18 of the convergent end 17 for binding all of the prongs 11. The drag portion 10 further includes a setting plate 13 for setting the prongs spread over it and a twisted wire portion 12 at the divergent end of the prongs 11 for connecting each of the prongs 11 firmly. The clamp bar 14 further includes a pin 16 at its center which has a protruded portion 161.

The handle portion 20 further includes a fork member 21 at its one end including a forked end 211 and a tail portion 211a, wherein the forked end 211 is extended downward and bent forward slightly. The fork member 21 is fixed to the handle portion 20 by two screws 213, 214 through two holes 212a, 212b at the tail portion 211a. The forked end 211 can be engaged to the pin 16 and retained firmly by the protruded portion 161 when the handle portion 20 is connected to the drag portion 10.

The invention further includes an engaging means 30 provided between the drag portion 10 and the handle portion 20 for connecting the two portions 10, 20 firmly, wherein the engaging means 30 includes a clip member 32 for clipping and a U-shaped member 31 for holding the top portion 18 of the convergent end 17 of the drag portion 10 and the handle portion 20 tightly as shown in FIG. 4. The clip member 32 is constituted by a single length of wire which is formed with two leg portions 32a, 32b and a curved portion 321 which is extended upward at an angle to the plane of the two legs 32a, 32b at one end of the clip member 32. The two leg portions 32a, 32b are provided with two inwardly bent portions 323, 324 respectively which overlap each other. The U-shaped member 31 is releasably connected to the two leg portions 32a, 32b of the clip member 32 so that the drag portion 10 and the handle portion 20 are easily detached from each other by releasing the U-shaped member 31 and opening the two inwardly bent portions 323, 324 of the clip member 32.

By the above-mentioned arrangement of the engaging means 30, the drag portion 10 and the handle portion 20 of the rake can be connected integrally when in use and detached from each other by releasing the engaging means 30 for convenience in transportation.

While this invention has been described with what are presently considered to be the most practical and preferred embodiments, it is to be understood that the invention is not to be limited to the disclosed embodiments, but on the contrary, is intended to cover various modifications and equivalent arrangements included within the spirit and scope of the appended claims, which scope is to be accorded the broadest interpretation so as to encompass all such modifications and equivalent structures.

I claim:

1. An improved rake comprising:
   a drag portion having a plurality of prongs which is set transversely at one end and convergent at the other end of said drag portion;
   a clamping bar provided on said drag portion at said convergent end for clamping said plurality of prongs, wherein said clamping bar further includes a pin at its center;
   a handle portion connecting to said convergent portion of said drag portion;
   a fork member provided at one end of said handle portion including a forked end which is engaged with said pin of said clamping bar; and
   an engaging means provided between said drag portion and said handle portion for connecting said two portions, including a clip member for clipping and a U-shaped member for holding said convergent end of said drag portion with said handle portion, wherein said clip member is constituted by a single length of wire which is formed with two leg portions with two inwardly bent portions at one end of said clip member and a curved portion which is extended upward at an angle to the plane of said two leg portions at the other end of said clip member.

2. An improved rake as claimed in claim 1, wherein said U-shaped member is releaseably connected to said two leg portions of said clip member.

3. An improved rake as claimed in claim 1, wherein said fork member further includes a tail portion which is fixed to said handle portion and said forked end is extended downward and then bent forward for engaging to said pin of said clamping bar.

4. An improved rake as claimed in claim 1, wherein said pin of said clamping bar further includes a protruded portion for retaining said forked end in said pin firmly.

* * * * *